United States Patent [19]

Newton et al.

[11] Patent Number: 4,896,367

[45] Date of Patent: Jan. 23, 1990

[54] ANTI-CORROSIVE STUFFING BOX ASSEMBLY

[75] Inventors: Hille Newton; Ron Belanger, both of Bonnyville, Canada

[73] Assignee: H & R Valve, Ltd., Bonnyville, Canada

[21] Appl. No.: 261,748

[22] Filed: Oct. 24, 1988

[51] Int. Cl.⁴ .................... F16C 33/72; E21B 33/00
[52] U.S. Cl. ........................... 384/16; 166/84;
    277/123; 277/125; 277/DIG. 6; 384/9; 384/97
[58] Field of Search ............... 384/97, 15, 16, 9, 29,
    384/42; 166/84, 244 C; 277/123, 125, DIG. 6

[56] References Cited

U.S. PATENT DOCUMENTS

| 354,658 | 12/1935 | Stockfleth . | |
|---|---|---|---|
| 1,453,324 | 5/1923 | Purtle | 384/16 |
| 1,735,193 | 11/1929 | Wilson | 384/15 |
| 2,137,853 | 11/1938 | Nixon | 384/16 |
| 2,466,239 | 4/1949 | Holcombe | 155/18 |
| 2,776,172 | 1/1957 | Deitrickson | 384/16 |
| 2,806,721 | 9/1957 | Fagg et al. | 384/16 |
| 3,734,181 | 5/1973 | Shaffer | 166/244 |
| 3,928,211 | 12/1975 | Browning et al. | 252/8.5 B |
| 4,045,591 | 8/1977 | Payne | 427/37 |
| 4,157,732 | 6/1979 | Fonner | 166/315 |
| 4,494,607 | 1/1985 | Ford et al. | 166/311 |

FOREIGN PATENT DOCUMENTS

| 1011998 | 6/1977 | Canada | 103/142 |
|---|---|---|---|
| 1027473 | 3/1978 | Canada | 166/27 |

Primary Examiner—Thomas R. Hannon
Attorney, Agent, or Firm—John E. Reilly

[57] ABSTRACT

In a well pumping unit of the type employing a polished rod, a stuffing box is disposed at the upper end of the wellhead which has axially spaced bearing assemblies, and packing coils positioned between a bearing section at either end of each assembly to guide the polished rod for reciprocal movement along a vertical path through the wellhead, each bearing section having annular portions connected together in end-to-end relation with one portion composed of brass and another portion composed of zinc which is capable of undergoing a reduction reaction with the oxygen present in the liquids and gases to effectively reduce corrosion of the polished rod.

13 Claims, 2 Drawing Sheets

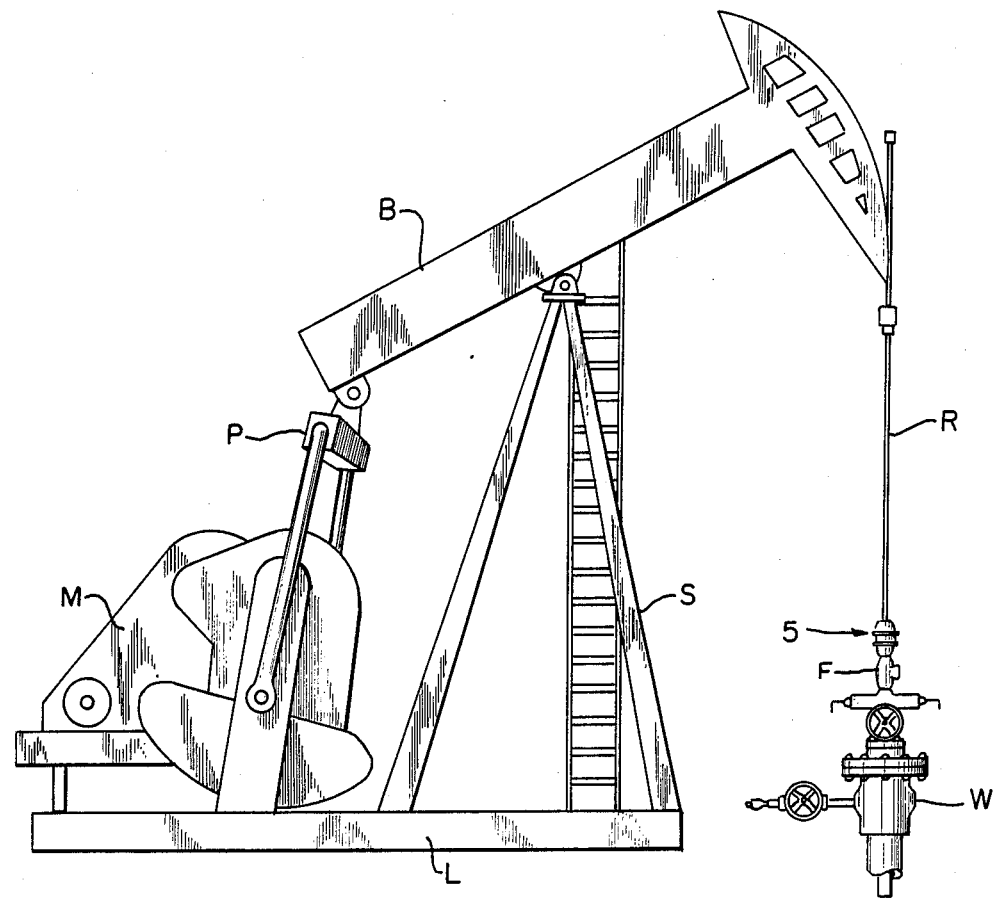
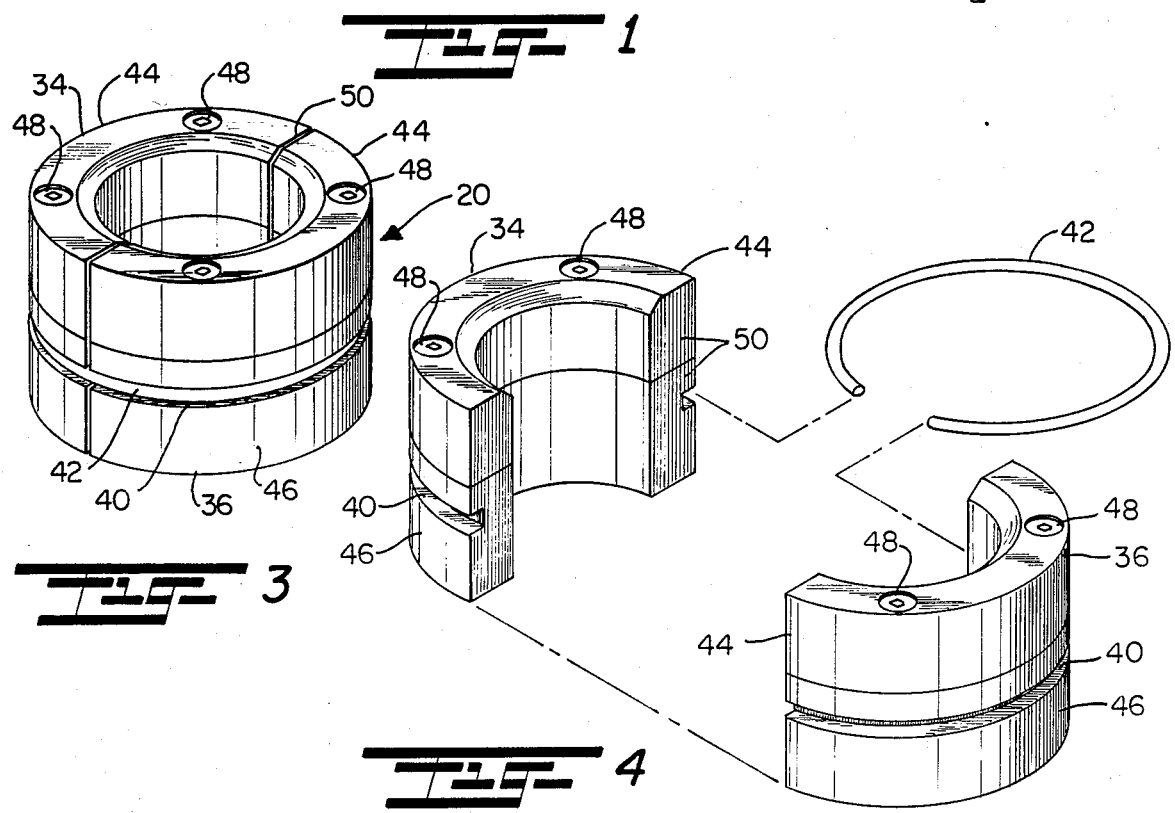

ANTI-CORROSIVE STUFFING BOX ASSEMBLY

This invention relates to well pumping apparatus, and more particularly relates to novel and improved apparatus for reducing corrosion of polished rods employed in wells.

BACKGROUND AND FIELD OF INVENTION

In well pumping apparatus, it is customary to employ a stuffing box at the wellhead to prevent oil, water and gases produced under pressure by the pumping apparatus from escaping into the atmosphere. Generally, the stuffing box is disposed in surrounding relation to the polished rod in order to guide or center the polished rod for vertical reciprocal movement without the escape of produced liquids or gases. Typically, the stuffing box is able to prevent the loss of produced liquids and gases by utilization of a series of packing coils which are compressed within the stuffing box by bearings at opposite ends of the coils and are squeezed or otherwise forced against the coils by threaded end members. The stuffing box is connected directly into the well production string, for example, by threading the lower end of a pack off assembly into a conventional flow tee or pipe fitting.

It is important that the polished rod be protected to the fullest extent possible from the corrosive effects of the fluids being pumped. If unchecked, the fluids will cause corrosion pits, deformities and eventual failure of the polished rod. This problem is particularly acute with oil well-produced fluids which often contain corrosive properties especially owing to the oxygen present in the fluids and which in combination with the static electricity generated by the reciprocal movement of the polished rod through the stuffing box will tend to accelerate the corrosive action on the polished rod.

It is well known that sucker rods and well tubing are subject to corrosion and pitting when operated in wells containing electrolytic fluids. This condition may be alleviated by providing metals higher in the electrolytic chemical series than the metals from which the sucker rods and tubing are formed so that the metals selected are decomposed by the electrolytic action rather than by the sucker rod or tubing. For instance, U.S. Pat. No. 2,466,239 to Holcombe employs lead or zinc scraper elements in a sucker rod guide in order to prevent deterioration of the sucker rods and tubing. A similar approach is taken in U.S. Pat. No. 4,157,732 to Fonner in which two different or dissimilar metals act as a galvanic couple in direct contact with the fluid being produced in the well and which will sacrificially corrode to establish a passageway for flow of fluids in the tubing. U.S. Pat. No. 3,734,181 to Schaffer reduces corrosion in an oil well pumping apparatus in which a pumping rod is mounted for reciprocation through a stuffing box containing zinc jackets and a spring, the zinc jacket serving as the high oxidation element and the spring acting as the low oxidation element. The spring is in electrical contact with the sides of the tubing and the jacket is in electrical contact with the rod, and there being a discharged battery having positive and negative terminals in order to provide a path to ground for the eddy currents and static electricity produced by the reciprocal motion of the rod and thus reduce the corrosion on the apparatus.

It has been found that greater efficiencies can be realized both in down time and preventing the escape of fluids into the atmosphere from a pumping well through the utilization of a novel and improved stuffing box which will accurately center and guide the polished rod for reciprocation and the selective mounting therein of corrosion-reducing sections formed as a part of the bearings in the stuffing box.

SUMMARY OF INVENTION

It is therefore an object of the present invention to provide for a novel and improved stuffing box assembly for a well pumping apparatus.

Another object of the present invention is to provide in a well pumping apparatus for a stuffing box assembly which is capable of reducing corrosion, pitting and weakening of the polished rod in an efficient and reliable manner.

A further object of the present invention is to provide for a stuffing box assembly for polished rods and the like which effectively retains the packing in place, centers the rod for reciprocation along the desired vertical path and significantly reduces corrosion and pitting of the rod and other metal parts of the pumping apparatus; and further wherein two dissimilar metals are incorporated as part of the bearing assembly for a stuffing box, one metal less Nobel than the other, the other metal being relatively inert and capable of guiding or centering a polished rod therethrough, and the one metal entering into a reduction reaction with the oxygen present in the liquids and gases to which the stuffing box is exposed during the pumping operation.

In accordance with the present invention, there is provided in a well pumping apparatus in which a stuffing box is mounted at the upper end of a wellhead and a polished rod is reciprocal along a vertical path through the stuffing box, the improvement of one or more bearing assemblies in axially spaced relation to one another in the stuffing box, packing coils in the stuffing box interpositioned between bearing sections at opposite ends, each bearing section being annular and including a portion composed of an inert material and a second portion having an anodic surface portion on its inner peripheral surface in surrounding relation to the polished rod, the first and second portions disposed in end-to-end relation to one another and in surrounding relation to the polished rod. Preferably, each bearing assembly includes means exerting a compressible force on the packing coils with each divided into semi-cylindrical halves, and a spring releasably secures the halves of the assembly together in surrounding relation to the polished rod. In the bearing sections, the first and second portions are composed of two dissimilar metals, the inert metal being brass and the anodic metal surface portion being zinc which will enter into a reduction reaction with the oxygen in the fluids.

The above and other objects, advantages and features of the present invention will become more readily appreciated and understood from a consideration of the following detailed description of preferred and alternate forms thereof when taken together with the accompanying drawings, in which:

BRIEF DESCRIPTION OF THE DRAWINGS

FIG. 1 is a schematic view of a pump jack and wellhead with a preferred form of stuffing box assembly mounted at the wellhead in accordance with the present invention;

FIG. 3 is an enlarged view of a top bearing in the preferred form of stuffing box assembly of FIG. 2;

FIG. 4 is an exploded view of the bearing shown in FIG. 3;

DETAILED DESCRIPTION OF THE PREFERRED EMBODIMENT

Figure 2:
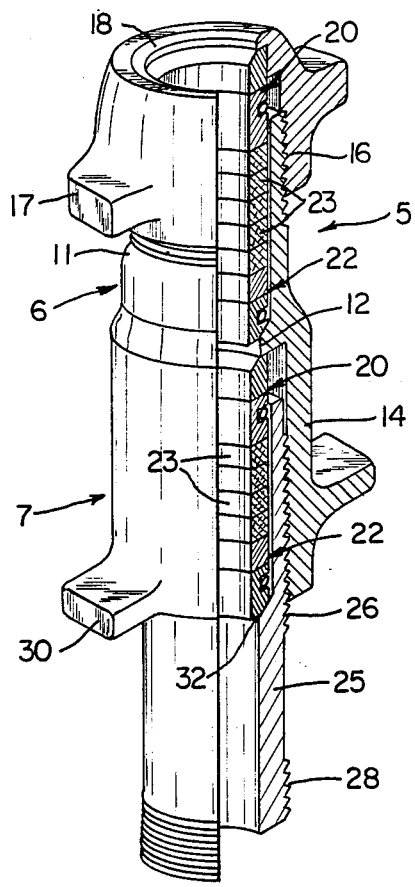
FIG. 2 is a view partially in section of a preferred form of stuffing box assembly in accordance with the present invention.

Referring in detail to the drawings, there is shown by way of illustrative example in FIG. 1 the mounting and disposition of a preferred form of stuffing box assembly 5 at the upper extremity of a wellhead W. A polished rod R is arranged at the end of a walking beam B for downward vertical extension through the stuffing box assembly 5 and wellhead W under the control of a pumping apparatus consisting of a motor drive M and pitman P at one end of the beam B opposite to the polished rod R. In accordance with conventional practice, the walking beam is mounted on a samson post represented at S and which is supported on a base pad L. The stuffing box assembly 5 is broadly comprised of an upper stuffing box 6 and a lower pack off unit 7 which are threadedly connected together in end-to-end relation. The outer body of the stuffing box 6 is of conventional construction and is made up of an outer hollow cylindrical fitting 11 having an internal shoulder 12 at its lower end and a downwardly depending, generally cylindrical skirt 14. The upper end of the fitting 11 is externally threaded as at 16 and a top cap 17 has mating internal threads for threaded engagement with the external threading 16 on the fitting 11. The upper extremity of the top cap 17 has an inwardly directed shoulder 18 at its upper extremity.

An important feature of the present invention resides in a bearing assembly which is contained within the stuffing box assembly 5 and is broadly comprised of a top bearing section 20 and bottom bearing section 22 between which are interposed a series of packing coils 23. The top and bottom bearing sections 20 and 22 will be hereinafter described in more detail, specifically in relation to FIGS. 1 to 10, but are positioned at opposite ends of the bearing assembly to contain the compressed fibrous packing coils 23 therebetween and to compress the packing coils by inward or downward threading of the top cap 17. The packing coils 23 are of generally annular configuration and may be suitably composed of asbestos, carbon or similar material and are dimensioned to be of an internal diameter corresponding to that of the external diameter of the polished rod R.

The lower pack off unit of the assembly 5 is made up of an elongated hollow cylindrical fitting 25 which is externally threaded as at 26 to threadedly engage complementary threading on the internal surface of the downwardly depending skirt 14 of the upper stuffing box assembly. External threading 28 is at the lower end of the fitting 25 and is threaded directly into the oil well production piping and specifically into the upper flow tee, designated at F on the wellhead W. A lock nut 30 at the lower end of the skirt 14 threadedly engages the fitting 25 along the threading 26 and an annular bearing assembly corresponding to that with reference to the stuffing box assembly and consisting of top bearing section 20, bottom bearing section 22 and packing coils 23 therebetween is mounted within the fitting 26 between an undersurface of the shoulder 12 and an internal shoulder 32 on the fitting 25. In a manner similar to that described with reference to the stuffing box assembly 5, compressive force exerted on the pack off unit bearings serves to compress the packing coils 23 to seal any fluids or gases against escape through the pack off unit into the stuffing box 5, for example, when the stuffing box 5 is being repaired.

Referring now in more detail to FIGS. 3 and 4, there is illustrated a preferred form of top bearing member 20 comprised of two semi-cylindrical halves 34 and 36 of corresponding construction, the halves including aligned semi-cylindrical grooves 40 for placement of a generally circular spring member 42 in assembling the halves 34 and 36 in surrounding relation to the polished rod R. Each half 34 and 36 is correspondingly made up of a zinc section 44 and brass section 46 mounted in flush, end-to-end relation and affixed together by self-tapping stainless steel screws 48 which extend downwardly through the entire thickness of the zinc and to terminate in the brass section. In the preferred embodiment, the top bearing member has a brass section 46 which is of slightly greater depth than the zinc section 44, and the screws are threaded into the brass section to a sufficient degree to insure that the zinc section remains securely affixed thereto. When assembled together by the spring wire 42, it will be observed that the flat confronting faces 50 move into flush engagement with one another when disposed in surrounding relation to the polished rod R.

Figure 5:
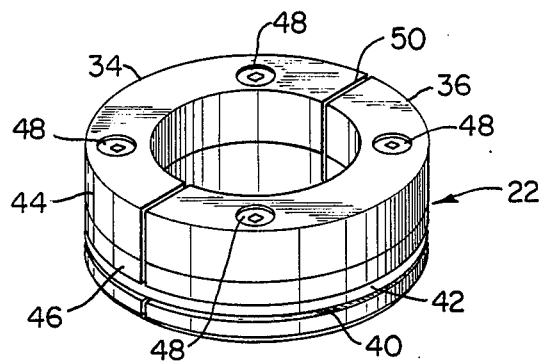
FIG. 5 is a somewhat perspective view of the lower bearing section of the preferred form of stuffing box assembly.
Figure 6:
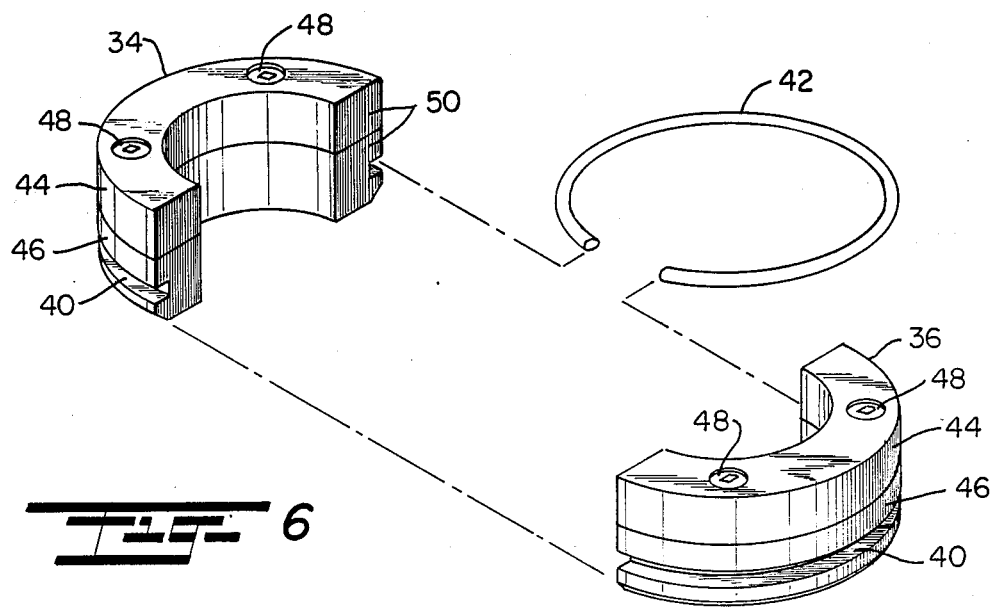
FIG. 6 is an exploded view of the lower bearing of FIG. 5.

FIGS. 5 and 6 illustrate a preferred form of bottom bearing member 22 in which like parts to those of the top bearing member 20 are correspondingly enumerated. As seen, the construction and arrangement of the zinc and brass sections 44 and 46 are identical as well as assembly of the halves 34 and 36 by a common spring wire 42 into surrounding relation to the rod R. However, in the bottom bearing member, the overall depth, or axial length, of the bearing member 22 is substantially less than that of the bearing member 20 and in particular the depth of the brass section 46 is substantially less than the brass section of the bearing member 20. For instance, the overall depth of the top bearing member 20 as illustrated in just over twice the depth of the bottom bearing member 22, although the relative depth may vary according to the particular application and diameter of the polish rod.

In assembling the bearing members into the stuffing box, the bottom bearing member 22 first is place din the lower end of the stuffing box packing cavity with the brass section 46 facing downwardly so as to leave the zinc section 44 in direct contact with the packing coils 23. The packing cavity above the bottom bearing member is filled with the packing coils 23 followed by insertion of the top bearing member or halves which are installed in surrounding relation to the polished rod R with the zinc section 44 facing upwardly and again leaving the brass section 46 facing downwardly and in direct contact with the packing coils. The top cap 17 is threaded onto the upper end of the stuffing box and tightened to an extent necessary to compress the packing coils 23 into contact with the external surface of the polished rod R. Another bearing member 22 is then placed into the lower end of the cavity of the pack off unit 7 with the brass section 46 facing downwardly.

Packing coils are inserted into the cavity as illustrated in FIG. 2 followed by insertion of a bearing member 20 above the packing coils 23 with the brass section 46 facing downwardly and the zinc section 44 facing upwardly and the brass section in direct contact with the packing coils 23. By rotating the stuffing box and in particular the fitting 11 in a direction to cause tightening or downward movement of the shoulder 12 against the top bearing member 20 the packing coils 23 are once again compressed between the upper and lower bearing members 20 and 22 in the pack off unit 7.

Typically, in producing oil wells with a beam type pump jack and a vertically reciprocating downhole pumping system, the system is operated intermittently depending upon the amounts of oil and gas to be produced and conservation requirements or considerations. It is mainly during the downtime that severe corrosion takes place, and the area of the polished rod R that rests in the stuffing box is affected most severely. The unique combination of zinc and brass sections in the top and bottom bearing members of the stuffing box 6 and pack off unit 7 reduce the amount of corrosion which takes place on the polished rod in the area that rests within the stuffing box assembly 5. In other words, the corrosion which normally takes place with the polished rod is replaced by corrosion of the zinc sections of the respective bearing members. The combination of zinc and brass in each of the respective bearing members serves to protect the polished rod R from corroding by having the zinc sections corrode in place of the polished rod; retain the ability of the brass sections to centralize and guide the polished rod through the oil well stuffing box assembly 7; and with the eventual corrosion of the zinc sections the brass sections will remain to maintain a positive compressive pressure on the packing coils. In addition, the assembly of the stuffing box is such as to facilitate replacement of the bearings and/or packing coils when worn or otherwise necessary.

In practice and actual use, the corrosion which occurs is essentially due to an electrochemical process in which the polished rod, where the dissolution is occurring, is separated by a physical distance from the stuffing box where a reduction reaction is occuring. A potential difference exists between these sites and current flows through the metal from the polished rod R to the stuffing box 5. This is accompanied by the flow of electrons from the polished rod R to the stuffing box assembly through the metal. The typical polished rod anodic reaction is $Fe++$ plus $2e-$. This reaction is accompanied by the reaction $Fe++$ plus $2OH-=Fe(OH)_2$. The ferrous hydroxide then combines with oxygen and water to produce ferric hydroxide, or iron rust. By encasing the circumference of the polished rod with the combination of zinc and brass bearing sections, the zinc component will serve as a negative electrode with the positive electrode being the oil well polished rod R. In this way, atoms of zinc are oxidized, giving up electrons and forming zinc ions $(Zn++)$: $Zn-2e-Zn++$. The advantage of employing brass as the inert component is that it is capable of withstanding the higher temperatures encountered within the stuffing box but is sufficiently soft to avoid galling off the polished rod.

It is therefore to be understood that various modifications and change may be made in the specific construction and arrangement of parts in the preferred embodiment of invention as described without departing from the spirit and scope thereof as defined by the appended claims.

We claim:

1. In well pumping apparatus wherein a stuffing box is mounted at the upper end of a wellhead and a polished rod is reciprocal along a vertical path through said stuffing box, the improvement comprising:
   a bearing assembly disposed in an annular cavity in said stuffing box, said bearing assembly having bearing sections at opposite ends thereof, packing coils in said stuffing box interposed between said bearing sections, said stuffing box including means exerting a compressive force on said packing coils, said bearing assembly being of annular configuration and each bearing section including a first portion composed of an inert material and a second portion having an anodic surface portion on its inner peripheral surface in surrounding relation to said polished rod, said first and second portions disposed in end-to-end relation to one another and in surrounding relation to said polished rod.

2. In well pumping apparatus according to claim 1, said bearing assembly divided into semi-cylindrical halves, and spring means releasably securing said halves together in surrounding relation to said polished rod.

3. In well pumping apparatus according to claim 1, each said bearing section composed of two dissimilar metals, one metal capable of undergoing a reduction reaction with fluids in said stuffing box.

4. In well pumping apparatus according to claim 1, including a pair of said bearing assemblies mounted at the top and bottom of said stuffing box, and means for exerting a compressive bearing force on each of said bearing assemblies.

5. In well pumping apparatus according to claim 4, each of said top and bottom bearing assemblies having anodic sections composed of a zinc material in contact with said packing coils.

6. In well pumping apparatus according to claim 5, each of said bearing sections having a first portion composed of brass and a second portion composed of zinc, each portion divided into semi-cylindrical halves and provided with flat, confronting end surfaces, and fastener means interconnecting said first and second portions together.

7. In well pumping apparatus according to claim 1, said first portion composed of an inert material and having means mounting said first portion to guide said polished rod in centered relation to said stuffing box, and said second portion composed of a material which will enter into a reduction reaction with oxygen contained in fluids in said stuffing box.

8. In well pumping apparatus wherein a stuffing box assembly is mounted at the upper end of a wellhead and a polished rod is reciprocal along a substantially vertical path through said stuffing box to induce the flow of fluids through a production string from a subsurface formation, the improvement comprising:
   said stuffing box provided with a plurality of annular cavities in axially spaced relation to one another, internal shoulder portions between said cavities and at opposite ends of said cavities, a bearing assembly in each of said cavities, each bearing assembly having a bearing section at opposite ends thereof and packing coils interposed between said bearing sections in each said assembly, said stuffing box including means exerting a compressive force on each of said bearing assemblies, each said bearing section having an anodic surface portion on its inner peripheral surface in surrounding relation to said polished rod, each said bearing section divided into semi-cylindrical halves, and force-exerting means for releasably connecting said halves together in surrounding relation to said polished rod.

9. In well pumping apparatus according to claim 8, said stuffing box having hollow cylindrical wall portions threadedly connected to one another, said force-exerting means defined by a cap at an upper end of said stuffing box threadedly connected to one of said well portions.

10. In well pumping apparatus according to claim 8, each of said bearing sections including an inert metal and means fastening said inert metal portion to said anodic surface portion.

11. In well pumping apparatus according to claim 8, each said bearing section having a first portion composed of brass and a second anodic surface portion composed of zinc, each said bearing section divided into semi-cylindrical halves provided with flat, confronting end surfaces, and fastener means interconnecting said first and second portions.

12. In well pumping apparatus according to claim 11, said anodic surface portion composed entirely of zinc, said zinc anodic surface portions disposed in direct contact with one end of said packing coil in each said bearing assembly.

13. In well pumping apparatus according to claim 8, one of said bearing sections being of greater depth than the other of said bearing sections.

* * * * *